(12) United States Patent
Baker et al.

(10) Patent No.: US 10,501,009 B2
(45) Date of Patent: Dec. 10, 2019

(54) BIDIRECTIONAL FIBER PANEL

(71) Applicant: Valeo North America, Inc., Troy, MI (US)

(72) Inventors: Patton Davis Baker, Seymour, IN (US); Kayla Greene, Seymour, IN (US); John Orisich, Seymour, IN (US); Brant Potter, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 42 days.

(21) Appl. No.: 15/864,484

(22) Filed: Jan. 8, 2018

(65) Prior Publication Data

US 2019/0210514 A1 Jul. 11, 2019

(51) Int. Cl.
*B60Q 1/26* (2006.01)
*G02B 6/42* (2006.01)
*H01Q 1/06* (2006.01)
*B60Q 1/00* (2006.01)
*F21V 8/00* (2006.01)

(52) U.S. Cl.
CPC .......... *B60Q 1/2696* (2013.01); *B60Q 1/0011* (2013.01); *B60Q 1/2607* (2013.01); *B60Q 1/2665* (2013.01); *G02B 6/001* (2013.01); *G02B 6/426* (2013.01); *G02B 6/4246* (2013.01); *H01Q 1/06* (2013.01); *G02B 6/0036* (2013.01)

(58) Field of Classification Search
CPC .. B60Q 1/2696; B60Q 1/0011; B60Q 1/2607; B60Q 1/2665; G02B 6/4246; G02B 6/426; H01Q 1/06

See application file for complete search history.

(56) References Cited

U.S. PATENT DOCUMENTS

| | | | |
|---|---|---|---|
| 4,975,809 A * | 12/1990 | Ku | B42D 15/022 362/104 |
| 6,325,517 B1 | 12/2001 | Kuo | |
| 2003/0091313 A1* | 5/2003 | Paradiso | B60R 16/0207 385/135 |
| 2007/0092431 A1* | 4/2007 | Resasco | B01J 23/882 423/447.3 |
| 2008/0025030 A9 | 1/2008 | Guillermo | |
| 2008/0025039 A1* | 1/2008 | Guillermo | A42B 3/044 362/556 |

* cited by examiner

*Primary Examiner* — Mary Ellen Bowman
(74) *Attorney, Agent, or Firm* — Oblon, McClelland, Maier & Neustadt, L.L.P.

(57) ABSTRACT

A light module, a light panel, and a method for transmitting light are provided. The light module includes a light source configured to generate a light and a fiber panel optically coupled to the light source. The fiber panel includes a plurality of optical fibers. The plurality of optical fibers are configured to define two illumination regions such that a controlled light is output from the two illumination regions in diametrically opposite directions.

20 Claims, 6 Drawing Sheets

BIDIRECTIONAL FIBER PANEL

BACKGROUND

As is well known, vehicles contain numerous types of lighting devices. For example, exterior vehicle lighting devices that perform a stop light function, tail lamp function, head lamp function, daytime running light function, dynamic bending light function, and fog light function are common.

Vehicle manufacturers have made an effort to design vehicle lighting devices in consideration of the styling of a vehicle on which the lighting devices are mounted. Further, vehicle manufacturers may provide optional lighting effects (in addition to the required lighting functionality) to enhance vehicle styling.

In recent years some vehicle manufacturers are utilizing organic light-emitting diodes (OLED) in an effort to meet desired lighting and aesthetic characteristics of vehicle lighting. OLED devices generally take the form of very thin panels that can be formed into three-dimensional shapes. Fiber panel LEDs may have a similar panel form to OLEDs. Fiber panels LEDs emit light from a single face.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

An aspect of the present disclosure includes a light module. The light module includes a light source configured to generate a light; and a fiber panel optically coupled to the light source. The fiber panel includes a plurality of optical fibers, the plurality of optical fibers are configured to define two illumination regions such that a controlled light is output from the two illumination regions in diametrically opposite direction.

In one embodiment, the fiber panel is planar.

In one embodiment, the fiber panel is configured in a ribbon shape.

In one embodiment, the fiber panel is configured in a helical shape.

In one embodiment, a first side of the fiber panel and a second side diametrically opposite to the first side are abraded.

In one embodiment, the light module also includes a second light source configure to generate second light; and wherein a first illumination region is configured to emit the second light and a second illumination region is configured to emit the light.

In embodiment, the light module comprises an automotive light module.

In one embodiment, each optical fiber of the plurality of optical fibers includes a first plurality of reflective surfaces and a second plurality of reflective surfaces diametrically opposite to the first plurality of reflective surfaces.

A further aspect of the present disclosure includes a fiber panel. The fiber panel includes a fiber portion including a plurality of optical fibers each configured to emit light along a respective length of the optical fiber, and the plurality of optical fibers are arranged to define two illumination regions of the fiber panel; a first light transmission portion provided on a first side of the fiber portion; and a second light transmission portion provided on a second side of the fiber portion, diametrically opposite to the first side of the fiber portion.

A further aspect of the present disclosure includes a method for transmitting light using a fiber panel having a plurality of optical fibers. The method includes coupling light to the plurality of optical fibers, the plurality of optical fibers being arranged to define two illumination regions diametrically opposite to each other; outputting a first portion of the light via a first illumination region; and outputting a second portion of the light via a second illumination region.

The foregoing paragraphs have been provided by way of general introduction and are not intended to limit the scope of the following claims. The described embodiments together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout several views, the following description relates to a bidirectional fiber panel.

Optical fibers are used to transmit light from one end of a fiber to the other end. This mode of operation based on total internal reflection (TIR) is used for lighting. Optical fibers may also be treated to emit light from the surface of the fibers. The alteration of optical fibers for the purpose of surface emission may involve grinding or abrading the surface of the fibers to produce regular or random surface features that allow some of the transmitted light to escape from the core of the optical fibers.

Fiber panel modules generally include a controller, a coupler, an optical fiber bundle, and a fiber panel (i.e., emitting panel). The fiber panel may include optical fibers from the optical fiber bundle that have been fixated on to a backing, and then processed to extract light. The fiber panel modules generally include a light source that inputs light to the optical fiber bundle having fibers extending therefrom to form the fiber panel. In current designs, light is emitted from one side of the fiber panel.

Figure 1A:
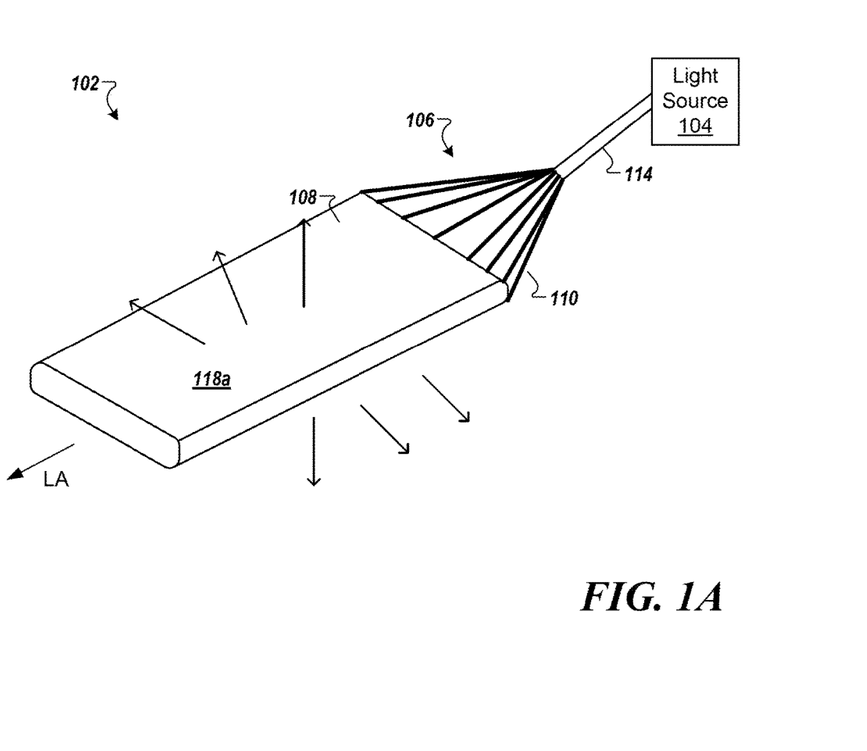
FIG. 1A is a schematic view of a fiber optic light panel device according to one example.

FIG. 1A is a schematic view of a fiber optic light panel device 102 according to one example. The fiber optic light panel device 102 includes a light source 104, a fiber bundle 106, and a fiber panel 108. The fiber panel 108 may include a cover layer on the top and bottom side of the fiber panel 108 such as a transmission layer as described further below. The light source 104 may be controlled via air operator interface (not shown).

The fiber bundle 106 may include a large number of glass or plastic optical fibers 110 that can be bound together at one end by bundling element 114. For example, the fiber bundle 106 may include a large number of abraded PMMA (Polymethyl methacrylate) fibers. The bundling element 114 may be formed from a brass or plastic ferrule, cable tie, tape, adhesive, or other material that can hold the fiber bundle 106 in a predetermined shape. Additional bundling elements may be used. The light generated by the light source 104 may be coupled to the fiber bundle 106 for transmission to the fiber panel 108. In the drawings, only a small number of optical fibers 110 is shown for simplicity. In one example the fiber bundle 106 may be coupled to the light source 104 via an optical fiber coupler (not shown). Further, the light source 104 may include a heat sink (not shown).

The fiber bundle 106 described herein may include from several tens of fibers to thousands of fibers. All or a part of the optical fibers 110 may be extended therefrom to form one or more fiber panels 108. In one implementation, the fiber bundle 106 may include approximately between 250 and 350 fibers of 0.23 mm diameter.

Optical fibers 110 can be arranged in a generally parallel relationship with respect to one another, parallel with longitudinal axis LA of the fiber 110. However, it should be understood that, optical fibers 110 may assume similar or different positions (e.g., parallel, non-parallel, curved, accurate or serpentine). Optical fibers 110 may have different sizes or dimensions, such as different parameters.

Figure 2:
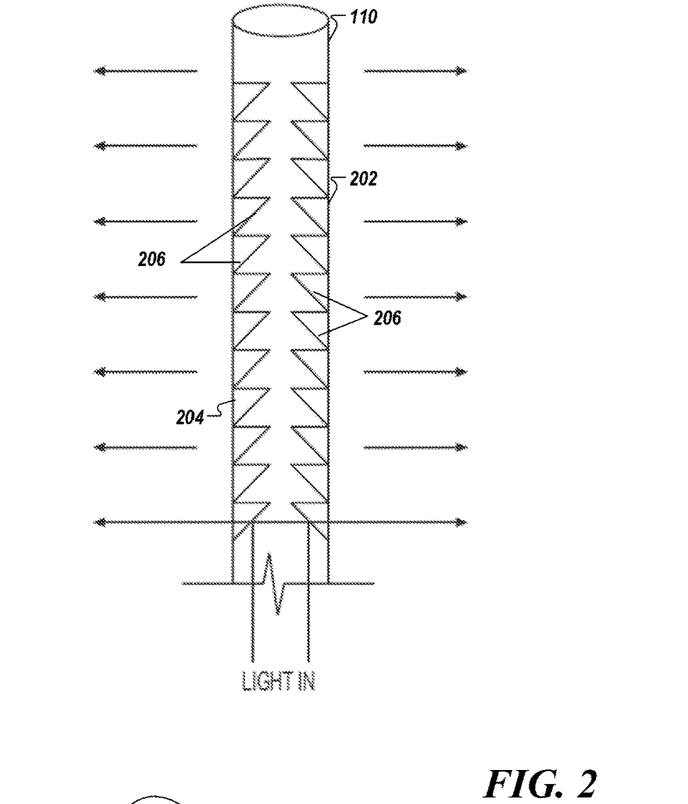
FIG. 2 is a schematic view of an optical fiber configured to emit light from diametrically opposite sides along a length of the optical fiber according to one example.

The optical fiber panel 108 includes a plurality of optical fibers configured to emit light along a respective length of the optical fiber 110, in which the optical fibers are arranged to define two illumination regions diametrically opposite to each other such that light is output from the two illumination regions to perform one or more vehicle lighting functions as described further below. The fibers of the fiber panel 108 may be abraded on both sides as shown in FIG. 2 in order to cause the light to come out of both sides of the fiber panel 108.

Light source 104 may include one or more light emitting devices or solid state light sources. The term "solid state" generally refers to light emitted by solid-state electroluminescence, as distinct from light emitted by a source of incandescence or fluorescence. For example, light source 104 may include an inorganic semiconductor light emitting diode (LED) or laser diode, an organic, light emitting diode (OLED), polymer light emitting diode (PLED), an LED lamp package, LED chip or LED die, or an array of one or more of these devices. When a plurality of devices of LEDs is used, the LEDs may have the same or different colors. The light source 104 may be an LED may be multiple discrete LEDs or an LED light bar. In one example, the light source 104 may be an LED providing 20-140 lm. The light source 104 may be controlled using a controller such as processor 621 of FIG. 6, described later herein. Lighting modules described herein can also include a laser state light source module.

Spatial variation of light in the fiber panel 108 may be achieved by use of multiple light sources for the optical fiber 110. For example, two light sources having different characteristics may be coupled to the optical fibers 110.

The fiber panel 108 can be used directly as a lighting function, or as a contributor to a lighting function in conjunction with other lighting function elements (i.e., supplemental). The fiber panel 108 can be used as a light contributor for tail, stop, turn, position, daytime running light (DRL), and sidemarker functions. For example, the fiber panel 108 can be used for signaling functions including a combination turn signal and parking lamp or a combination parking lamp and a daytime running lamp.

Figure 5:
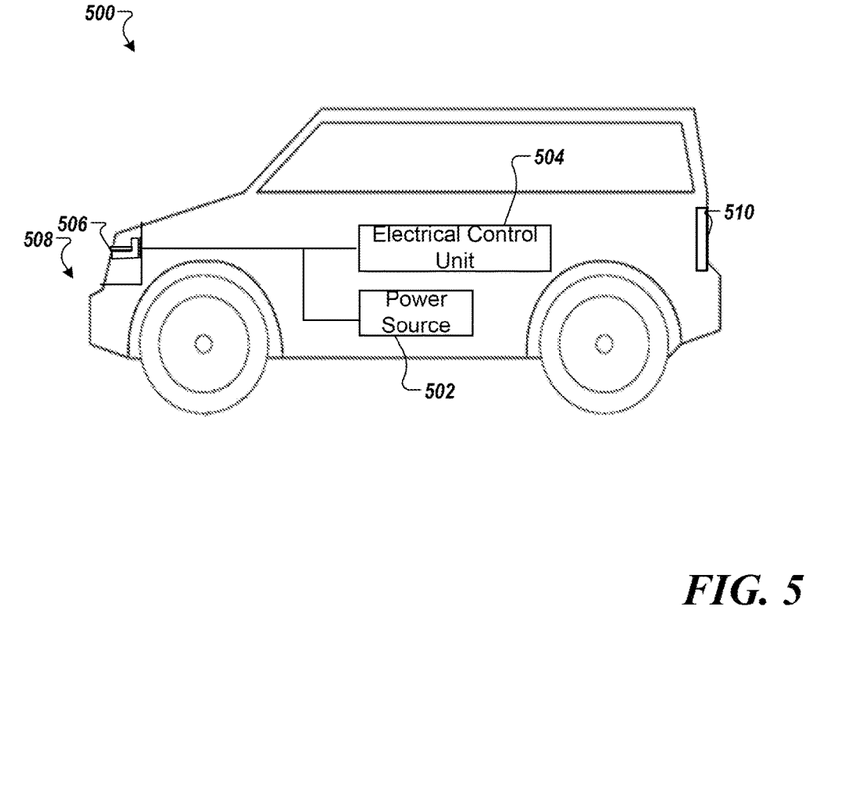
FIG. 5 is a schematic that shows a side view of a motor vehicle according to one example.

In one implementation, the fiber panel 108 may be included in a headlamp assembly that includes a high beam headlamp and a low beam headlamp as shown in FIG. 5.

In one implementation, the fiber panel 108 may be included in a rear lamp assembly. Rear lamp assemblies include a combination brake lamp and tail lamp or a combination tail lamp and a turn signal lamp The fiber panel 108 can be used as a controlled light source for secondary optics. The fiber panel 108 can be used as a styling element.

Additional abrasions to the optical fibers 110 can allow higher output and better performance. Altering the optical fibers 110 to direct light in a desired direction can be achieved through a variety of methods including, but not limited to, providing the plurality of reflective surfaces as described previously herein, laser ablating a surface of a fiber, mechanical abrasion of a surface of each fiber 110, and the like. Further, depth, density and type of the alterations may be varied along the length of each fiber. For example, spacing between reflective surfaces may be varied in different portions of the fiber to achieve more or less light intensity at the surface of the fiber and/or to permit more or less light to be emitted from an end of the optical fibers 110 and therefore from the fiber panel 108.

In one implementation, the fiber panel 108 may include a lamination of one or more layers of optical fibers 110 alternated with one or more layers of a transparent materiel. The transparent material may be a polyester substrate, a polycarbonate material, or the like. In one implementation, the optical fibers 110 are glued together.

Figure 1B:
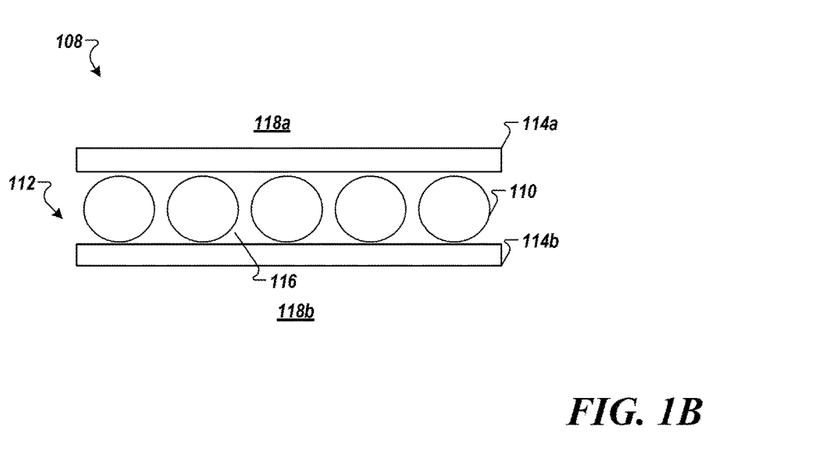
FIG. 1B is a cross sectional view of a fiber panel according to one example.

FIG. 1B provides a schematic view of a cross section of the fiber panel 108 of FIG. 1A. As seen, the panel includes a fiber portion 112 and transmission portions 114. The fiber portion includes the plurality of fibers 110 arranged side-by-side in an array. The fibers may be encapsulated in as surrounding material 116 such as resin. Adhesive layers may be used to connect portions of the panel as discussed below. The transmission portions 114 are optional. The transmission portions 114 may be provided at the one or two light emitting sides of the panel to achieve various optical effects to light output from the fibers 110. While shown as planer layers in FIG. 1B, portions 112 and 114 may be other non-planer forms. Further, the teens "portion" and "layer" are used interchangeably herein and encompass single and multilayer structures, as well as integral structures having added materials and/or optical structures formed thereon.

Transmission portions 114a and 114b may have the same or different optical properties to achieve a desired light output/type from illumination regions 118a and 118b. Light type can include color, hue, tint, tone, and/or shade of the light output in illumination regions 118a and 118b, as well as intensity, brightness, or any other desired photometric characteristic. In one implementation, illumination region 118a may have a first light type having a first color (e.g., red) provided by a first light source (not shown) at a first intensity. Illumination region 118b may have a second light type having a second color (e.g., green) provided by a second light source at a second intensity. Different characteristics of illumination regions 118a and 118b may serve different automotive lighting functions. For example, the illumination region 118a may serve as a signal light while illumination region 118b may serve as a decorative light.

Figure 1C:
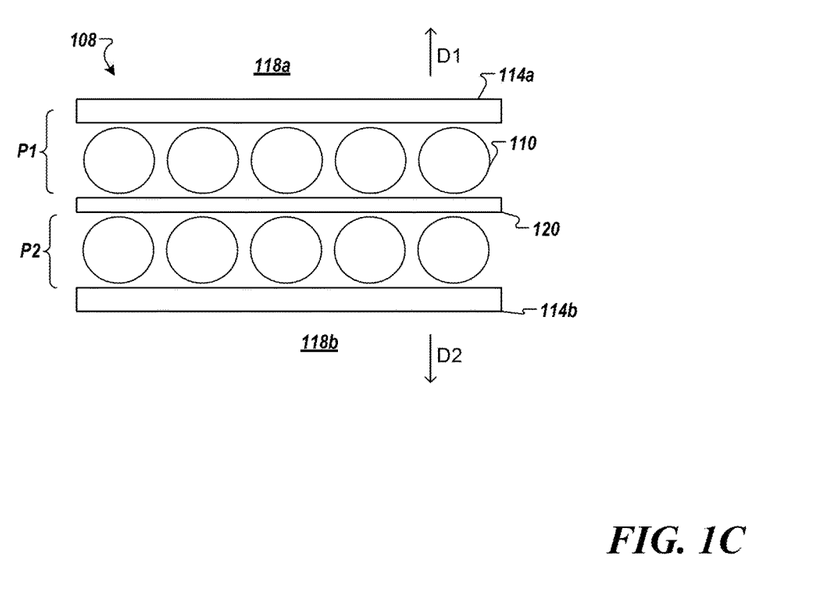
FIG. 1C is a cross sectional view of the fiber panel according to one example.

In one embodiment, the optical fibers are provided in different planes. For example, a first group of optical fibers are each positioned in a first plane P1, and a second group of optical fibers are each positioned in a second plane P2. The first and second planes P1 and P2 may be encapsulated in material 116 or provided in separate light sub-panels joined with adhesive 120 as shown in FIG. 1C. The adhesive 120 is preferably an optical adhesive to promote the desired light output. The first group of optical fibers may be configured to emit in a first direction D1. The second group of optical fibers may be configured to emit light in a second direction D2.

Further any of the layers 114, 116, 120 can be enhanced with pigments, nanoparticles, phosphors or other additives to change optical properties across the panel area. The chosen additive can be graded in density across the panel 108 to achieve spatial effects, and/or the type of additive can be varied across the panel area. In one example, phosphor conversion (PC) may be used to affect wavelength (color) output of the panel, and/or diffusing materials included to affect light scattering of the light output from the panel 108 in illumination regions 118a and 118b.

FIG. 2 is a schematic view of an optical fiber configured to emit light from diametrically opposite sides along a length of the optical fiber according to one example. In one implementation, the optical fiber 110 may be modified to include optics such as plurality of facets or reflective surfaces 206 which direct or reflect the light through a first surface 202 and/or a second surface 204. Altering the fibers 110 to direct light in a desired direction can be achieved through a variety of methods including, but not limited to: providing the plurality of facets or reflective surfaces 206 as mentioned, laser ablating a surface of the fiber 110, mechanical abrasion of a surface of each fiber 110, and the like.

Figure 3:
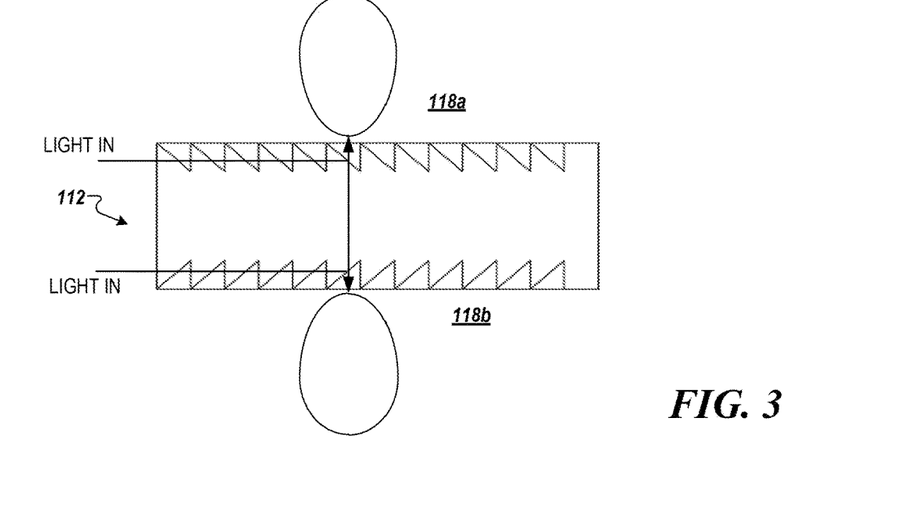
FIG. 3 is a schematic view of the fiber panel configured to emit light along diametrically opposite sides according to one example.

FIG. 3 is a longitudinal cross section view of the fiber panel 108 according to one example. As shown in FIG. 3, the fiber panel 108 provides Lambertian illumination output in illumination regions 118a and 118b.

Figure 4A:
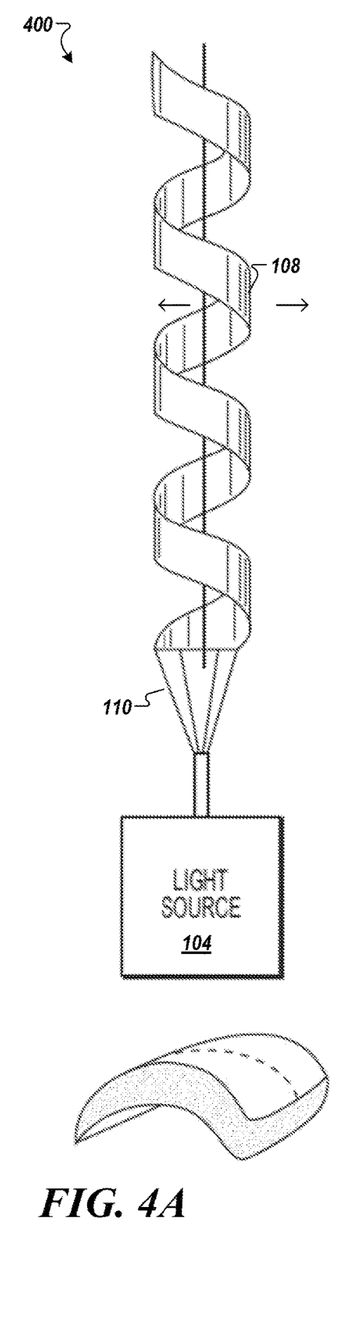
FIG. 4A is a schematic that shows the fiber panel configured in a ribbon shape according to one example.
Figure 4B:
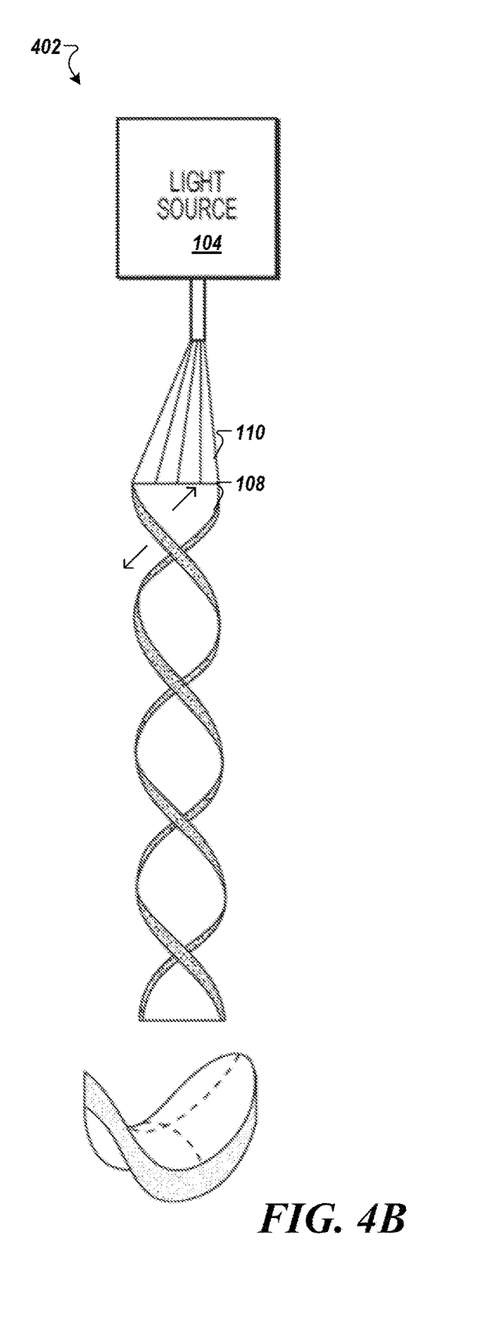
FIG. 4B is a schematic that shows the fiber panel configured in a helical shape according to one example.

The fiber panel described herein may be pliable and flexible and may be used to create shapes for optional lighting effects to enhance vehicle styling. For example, the fiber panel 108 may be formed into a three dimensional shape that meets the aesthetic and technical requirements of a particular application. FIG. 4A shows the fiber panel 108 configured in, a ribbon shape. FIG. 4B shows the fiber panel 108 formed into a helical shape.

The ribbon shape may have spatial variation. The light output characteristics may be varied from a first end to a second end of the fiber panel. In one implementation, the light output intensity may be greater at the first end and may decrease at the second end.

FIG. 5 is a schematic that shows a side view of a motor vehicle 500 according to one example. The motor vehicle 500 may include a power source 502 and an electrical control Unit 504. FIG. 5 shows a headlamp assembly 506, a front lamp assembly 508, and a rear lamp assembly 510. The front lamp assembly 508 can be separate from the headlamp assembly 506 or can be incorporated into the same assembly module. The rear lamp assembly 506 represents signaling functions, such as a combination brake lamp and tail lamp or a combination tail lamp and a turn signal lamp.

Figure 6:
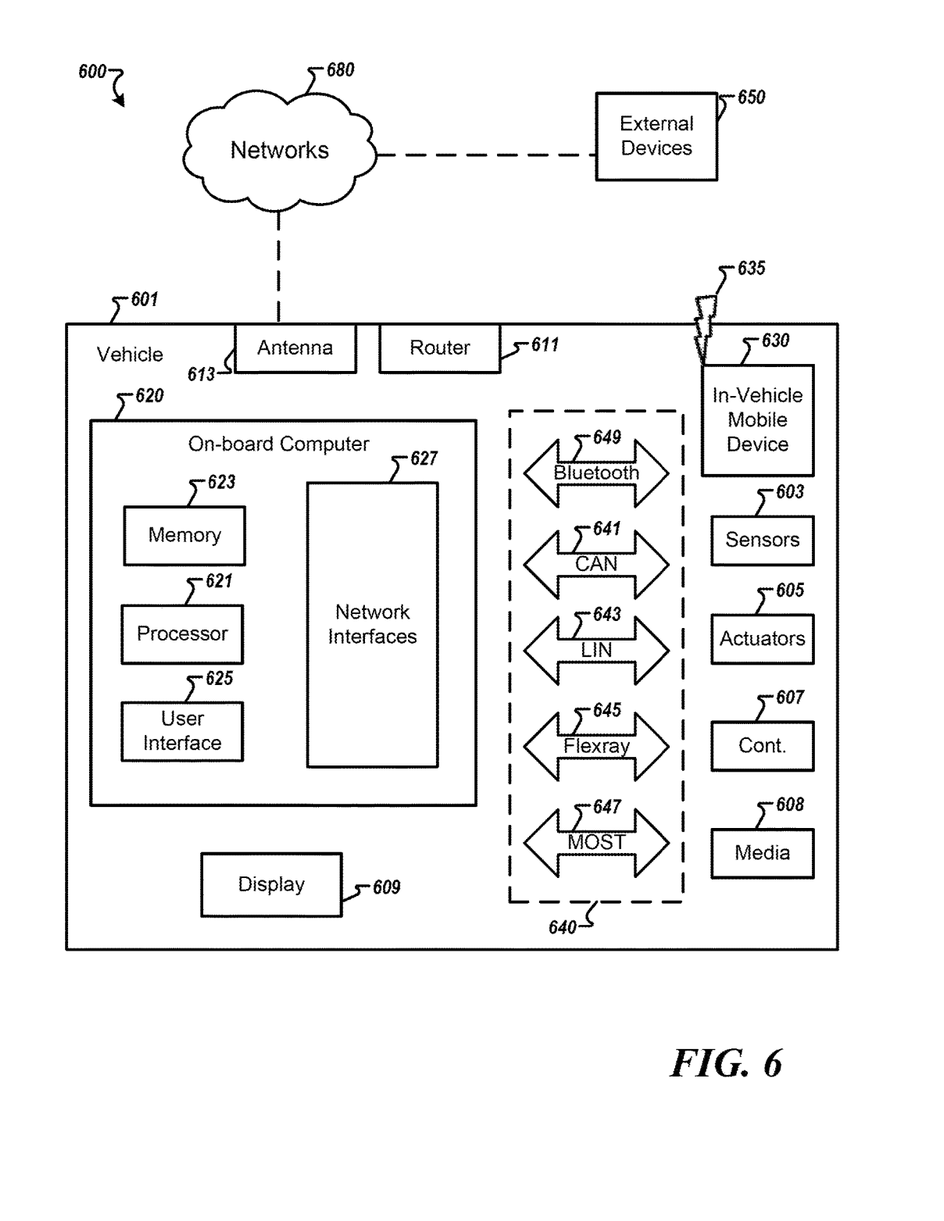
FIG. 6 is a simplified block diagram of a vehicle environment in which embodiments of the invention disclosed herein may be implemented.

FIG. 6 is a simplified block diagram of a vehicle environment 600 in which embodiments of the invention disclosed herein may be implemented. The vehicle environment 600 includes a vehicle 601 in communication with one or more external devices 650 by way of one or more external networks 680. Vehicle 601 also includes various internal networks 640 for interconnecting several vehicle devices within the vehicle as will be discussed below. The vehicle environment 600 may also include one or more in-vehicle mobile device 630. External devices 650 include any device located outside the vehicle 601 such that the external device must communicate with the vehicle and its devices by an external network 680. For example, the external devices may include mobile devices, electronic devices in networked systems (e.g., servers or clients in a local area network (LAN), etc.), on board computers of other vehicles etc. In-vehicle mobile devices 630 are devices which are located within, or in the vicinity of the vehicle 601 such that the in-vehicle mobile device can communicate directly with internal networks 640 of the vehicle 601. In-vehicle mobile devices 630 may also connect with external networks 680.

Vehicle 601 includes vehicle devices integral with or otherwise associated with the vehicle 601. In the embodiment of FIG. 6, vehicle devices include one or more sensors 603, one or more actuators 605, one or more control units 607, one or more media systems 608, one or more displays 609, one or more routers 611, one or more antenna 613, and one or more on board computers 620. The one or more on board computers may generate signals having a desired duty factor to control one or more vehicle lights such as the light source 104. As used herein, the term "vehicle device" is meant to encompass sensors, actuators, controllers, electronic control units (ECUs), detectors, instruments, embedded devices, media devices including speakers, a CD and/or DVD player, a radio, vehicle navigation systems (e.g., GPS) displays, other peripheral or auxiliary devices or components associated with the vehicle 601.

Sensors 603 detect various conditions within (or in the immediate vicinity of) the vehicle 601. For example, sensors 603 may be temperature sensors, photosensors, position sensors, speed sensors, angle sensors or any other sensor for detecting a diagnostic condition or other parameter of the vehicle 601 or its ambient environment. Sensors 603 may be passive or "dumb" sensors that provide an analog representative of the sensed parameter, or so called "smart" sensors with integrated memory and digital processing capability to analyze the parameter sensed within the sensor itself. Actuators 605 cause motion of some mechanical element of the vehicle in response to a control signal. For example, actuators 605 may be hydraulic actuators, pneumatic actuators or electrical/electronic actuators such as a stepper motor. Actuators 605 may be used to move vehicle lighting devices to implement intelligent light, for example. Actuators 605 may be used to move the light source 104.

Actuators 605 may also be "dumb" devices that react to a simple analog voltage input, or "smart" devices with built-in memory and processing capability. Actuators 605 may be activated based on a sensed parameter from sensors 603, and one such sensed parameter may be a physical position of the actuator 603 itself. Thus, the sensors 603 and actuators 605 may be connected in a feedback control loop for diagnostic detection and control of the vehicle 601.

On-board computer 620 is a vehicle device for providing general purpose computing functionality within the vehicle 601. The on-board computer 620 typically handles computationally intensive functions based on software applications or "apps" loaded into memory. On-board computer 620 may also provide a common interface for different communication networks in the vehicle environment 600. On-board computer 620 includes one or more processor 621, one or more memory 623, one or more user interface 625 (e.g., the operator interface described previously herein), and one or more network interface 627.

In example embodiments, the operations for controlling the light source 104 may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.).

Multiple internal vehicle networks represented by 640 may exist in the vehicle 601 to provide communication pathways to various vehicle devices distributed throughout the vehicle 601. An internal vehicle network 640 is a collection of nodes, such as vehicle devices, integrated with or otherwise linked to the vehicle and interconnected by communication means. Vehicle networks 640 typically include hard wired bus type networks, each providing communication pathways to particular vehicle devices distributed throughout a vehicle. FIG. 6 shows four examples of such hard wired networks: Controller Area Network (CAN) 641, Local Internet Network (LIN) 643, Flexray bus 645, and Media Oriented System Transport (MOST) network 647.

Other hard wired internal networks such as Ethernet may be used to interconnect vehicle devices in the vehicle 601. Further, internal wireless networks 649, such as near field communications, Bluetooth, etc. may interconnect vehicle devices.

Users (driver or passenger) may initiate communication in vehicle environment 600 via some network, and such communication may be initiated through any suitable device such as, in-vehicle mobile device 630, display 609, user interface 625, or external devices 650, for example to activate the light source 104.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A vehicle light module, comprising:
   a light source from a vehicle configured to generate a light; and
   a fiber panel optically coupled to the light source, the fiber panel including a plurality of optical fibers, the plurality of optical fibers are configured to define two illumination regions such that a controlled light is output from the two illumination regions in diametrically opposite directions, wherein each optical fiber of the plurality of optical fibers is abraded on two sides diametrically opposite to each other.

2. The light module of claim 1, wherein the fiber panel is planar.

3. The light module of claim 1, wherein the fiber panel is configured in a ribbon shape.

4. The light module of claim 1, wherein the fiber panel is configured in a helical shape.

5. The light module of claim 1, wherein a first side of the fiber panel and a second side diametrically opposite to the first side are abraded.

6. The light module of claim 1, further comprising:
   a second light source configure to generate second light; and
   wherein a first illumination region of the two illumination regions is configured to emit the second light and a second illumination region of the two illumination regions is configured to emit the light generated from the light source.

7. The light module of claim 1, wherein the light module comprises an automotive light module.

8. The light module of claim 1, wherein each optical fiber of the plurality of optical fibers includes a first plurality of reflective surfaces and a second plurality of reflective surfaces diametrically opposite to the first plurality of reflective surfaces.

9. A fiber panel within a vehicle, comprising:
   a fiber portion including a plurality of optical fibers each configured to emit light along a respective length of the optical fiber, and the plurality of optical fibers are arranged to define two illumination regions of the fiber panel;
   a first light transmission portion provided on a first side of the fiber portion; and
   a second light transmission portion provided on a second side of the fiber portion, diametrically opposite to the first side of the fiber portion, wherein each optical fibers of the plurality of optical fibers is abraded on two sides diametrically opposite to each other.

10. The fiber panel of claim 9, wherein each optical fiber of the plurality of optical fibers is configured to emit light in diametrically opposite directions along a length of the optical fiber.

11. The fiber panel of claim 10, wherein each optical fiber of the plurality of optical fibers includes a first plurality of reflective surfaces and a second plurality of reflective surfaces, the second plurality of reflective surfaces being diametrically opposite to the first plurality of reflective surfaces.

12. The fiber panel of claim 10, wherein the fiber portion is formed in a hyperbolic shape.

13. The fiber panel of claim 12, wherein the fiber portion is formed in a helical shape.

14. The fiber panel of claim 12, wherein the fiber portion is formed in a ribbon shape.

15. The fiber panel of claim 12, wherein light output characteristics from the first light transmission portion match light output characteristics from the second light transmission portion.

16. The fiber panel of claim 15, wherein the light output characteristics include different colors suitable for different automotive lighting functions respectively.

17. A method for transmitting light through a vehicle light module using a fiber panel having a plurality of optical fibers, the method comprising:
    coupling light to the plurality of optical fibers, the plurality of optical fibers being arranged to define two illumination regions diametrically opposite to each other;
    outputting a first portion of the light via a first illumination region; and
    outputting a second portion of the light via a second illumination region, wherein each optical fiber of the plurality of optical fibers is abraded on two sides diametrically opposite to each other.

18. The method of claim 17, wherein each optical fiber of the plurality of optical fibers is configured to emit light in diametrically opposite directions along a length of the optical fiber.

19. The method of claim 17, wherein the fiber panel is formed in a three dimensional shape.

20. The method of claim 17, wherein the fiber panel is included in an automotive light module.

* * * * *